United States Patent
Wong et al.

(10) Patent No.: US 7,840,551 B2
(45) Date of Patent: Nov. 23, 2010

(54) METHOD AND APPARATUS FOR AUTOMATICALLY CLASSIFYING DATA

(75) Inventors: Daniel ManHung Wong, Sacramento, CA (US); Amit Ganesh, San Jose, CA (US); Bipul Sinha, Foster City, CA (US); Chi Ching Chui, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 482 days.

(21) Appl. No.: 11/933,756

(22) Filed: Nov. 1, 2007

(65) Prior Publication Data
US 2010/0030781 A1  Feb. 4, 2010

(51) Int. Cl.
*G06F 17/00* (2006.01)
(52) U.S. Cl. .................. 707/713; 707/722; 707/736; 707/758; 707/781; 707/791

(58) Field of Classification Search .......... 707/600–831
See application file for complete search history.

(56) References Cited

U.S. PATENT DOCUMENTS

| | | | |
|---|---|---|---|
| 5,355,474 A | 10/1994 | Thuraisngham | |
| 6,236,996 B1 | 5/2001 | Bapat | |
| 2005/0038788 A1 | 2/2005 | Dettinger | |
| 2008/0312906 A1* | 12/2008 | Balchandran et al. | 704/9 |

* cited by examiner

*Primary Examiner*—Isaac M Woo
(74) *Attorney, Agent, or Firm*—Park, Vaughan, Fleming & Dowler LLP

(57) ABSTRACT

One embodiment of the present invention provides a system for automatically classifying data in a database. During operation, the system receives and executes a database operation. Next, the system automatically determines if any data was modified as a result of executing the database operation. If so, for each data item that was modified, the system automatically determines if the data item is associated with a classification-rule. If so, the system automatically reclassifies the data item according to the classification-rule. If not, the system leaves a classification of the data item unchanged.

25 Claims, 3 Drawing Sheets

METHOD AND APPARATUS FOR AUTOMATICALLY CLASSIFYING DATA

BACKGROUND

1. Field of the Invention

The present invention relates to computer security. More specifically, the present invention relates to a method and apparatus for automatically classifying data based on the sensitivity of the data to facilitate providing security for the data.

2. Related Art

Databases often store data items which have varying levels of sensitivity. To determine whether a table includes sensitive data, an administrator typically analyzes data stored in the table to determine whether the data is sensitive. If so, the administrator can take appropriate action, such as restricting access to the table. However, the process of examining the data in a database can be time-consuming and tedious, especially if the database is large. Moreover, if the sensitivity level of the data changes, the process of analyzing the data may need to be repeated.

Furthermore, it is difficult to determine a priori whether an administrator who is classifying the data has a high enough privilege to examine the data because prior to examining the data, the sensitivity level of the data is unknown. Thus, in some cases, the number of administrators who can classify the data is small.

Hence, what is needed is a method and apparatus for automatically classifying data in a database without the problems listed above.

SUMMARY

One embodiment of the present invention provides a system for automatically classifying data in a database. During operation, the system receives and executes a database operation. Next, the system automatically determines if any data was modified as a result of executing the database operation. If so, for each data item that was modified, the system automatically determines if the data item is associated with a classification-rule. If so, the system automatically reclassifies the data item according to the classification-rule. If not, the system leaves a classification of the data item unchanged.

In a variation on this embodiment, determining if any data was modified as a result of executing the database operation involves examining a transaction log for the database.

In a variation on this embodiment, the classification for the data item is associated with a privilege-level required to access the data item.

In a variation on this embodiment, determining if the data item is associated with the classification-rule involves using a hash function to facilitate identifying the classification-rule associated with the data item.

In a variation on this embodiment, determining if the data item is associated with the classification-rule involves matching the data item to a pattern which is associated with the classification-rule.

In a variation on this embodiment, the system executes additional operations specified by the classification-rule.

In a further variation, the additional operations can involve: encrypting the data item; encrypting a row in the database associated with the data item; encrypting a column in the database associated with the data item; encrypting metadata in the database associated with the data item; decrypting the row in the database associated with the data item; decrypting the column in the database associated with the data item; decrypting the metadata in the database associated with the data item; sending an alert to a user who is associated with the classification-rule; rejecting the database operation; recording operations involving the data item in a log; modifying access control privileges associated with the data item; and auditing the database.

In a variation on this embodiment, the system presents the data item to a user after reclassifying the data item.

In a variation on this embodiment, determining if the data item is associated with the classification-rule further involves determining if the data item satisfies an arbitrary rule. For example, the system may reclassify the data only if the data was modified outside of normal operating hours.

DETAILED DESCRIPTION

Figure 1:
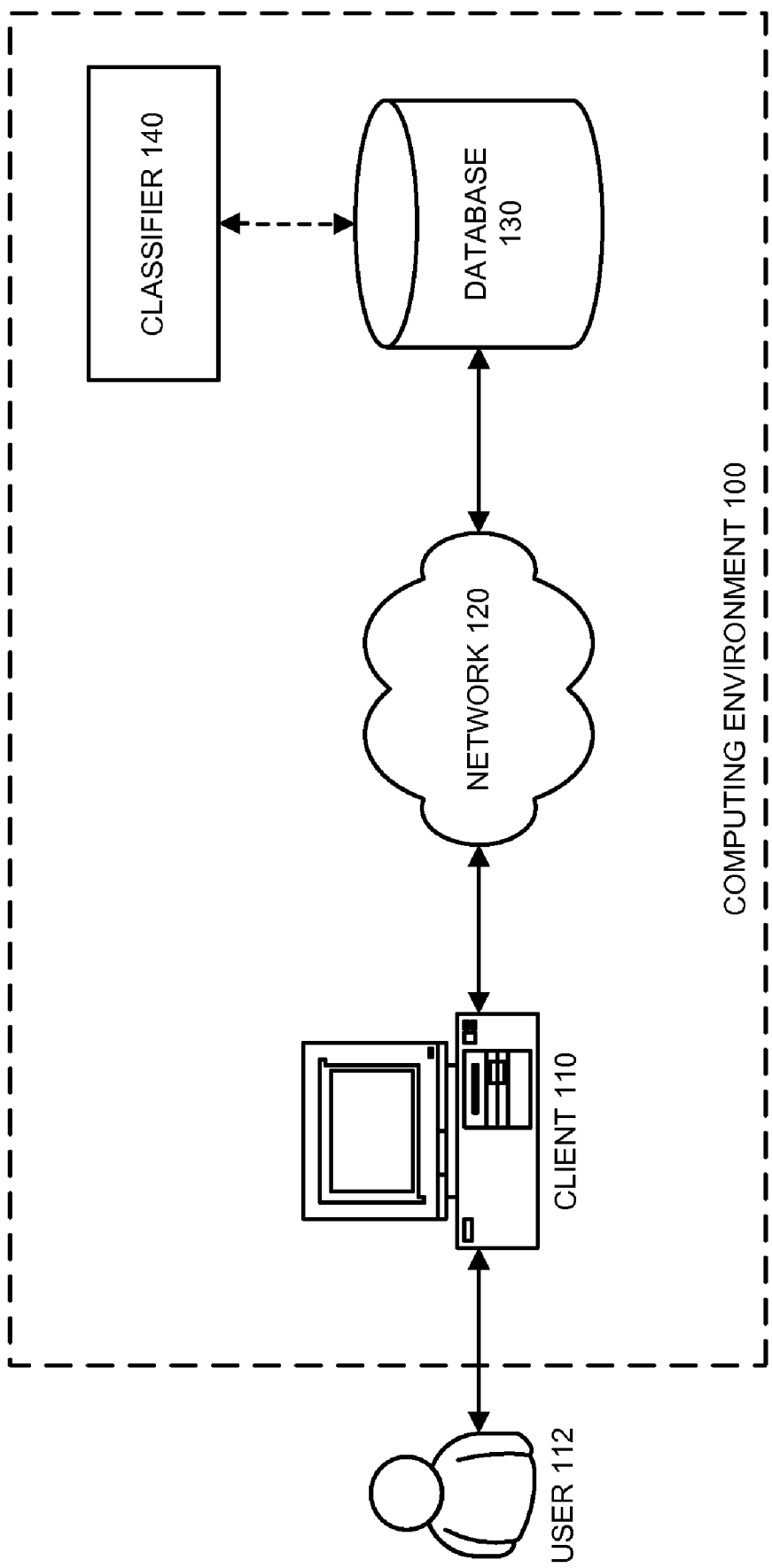
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a classifier that can automatically reclassify data in a database in response to any relevant data-change in the database. This classifier specifies classification-rules in a database change-notification system, which identifies the relevant data changes. Furthermore, the classifier reclassifies the data based on these classification-rules. For example, the addition of the keyword "anthrax" to a database column having a low sensitivity rating, would automatically reclassify the database column to a higher sensitivity rating. In a second example, the addition of the keywords "kill" and "die" to the same database column would result in the database column receiving an even higher sensitivity rating. In response to the database column being reclassified with a higher sensitivity rating, the classifier can trigger additional operations. For example, these additional operations can involve auditing a table that includes the database column, encrypting data stored in the database column, or activating an intrusion detection system.

In one embodiment of the present invention, the relevant data-change can include: changes to specific data; changes to any data; specific changes to any data; specific changes to specific data; creation of data; deletion of data; and any other changes to data that can occur during a database operation.

In one embodiment of the present invention, in response to a database executing a database operation, the classifier examines data modified by the database operation. Then, for each data item that was modified, the classifier determines if there exists a classification-rule associated with the modified data item. If so, the classifier reclassifies the data item based on the classification-rule. Note that this process can occur automatically (i.e., without the assistance of a user) in response to receiving the database operation.

In one embodiment of the present invention, the classifier identifies a classification-rule for any data item that is accessed. The classifier then reclassifies the data item based on the classification-rule. Note that if the classification-rule has not been modified since the last time the data item was accessed, the data item is not reclassified. This process enables the classifier to reclassify data without examining the entire database.

In one embodiment of the present invention, the classifier examines a transaction log to determine if the data has been modified or accessed.

In one embodiment of the present invention, the classifier examines volatile memory, such as Random Access Memory (RAM) to determine if the data has been modified or accessed.

In one embodiment of the present invention, the classification-rules are pre-defined by a user.

In one embodiment of the present invention, a user can add new classification-rules to the classifier, or can amend existing classification-rules. Note that data can automatically be reclassified when the data is accessed. Furthermore, note that this reclassification of the data may prevent the data from being accessed by the user or a second user.

In one embodiment of the present invention, the classifier can reclassify the data before presenting the data to the user or the second user.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client 110, network 120, database 130, and classifier 140.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 includes the Internet.

Database 130 can generally include any type of system for storing data in non-volatile storage. This includes, but is not limited to, systems based upon magnetic, optical, and magneto-optical storage devices, as well as storage devices based on flash memory and/or battery-backed up memory.

Classifier 140 can generally include any system for classifying data without the assistance of user 112. Note that database 130 includes classifier 140.

In one embodiment of the present invention, classifier 140 is a stand-alone system. In this embodiment, classifier 140 can communicate with database 130 via network 120.

User 112 can generally include: an individual; a group of individuals; an organization; a group of organizations; a computing system; a group of computing systems; or any other entity that can interact with computing environment 100.

In one embodiment of the present invention, user 112 can be a client.

Database

Figure 2:
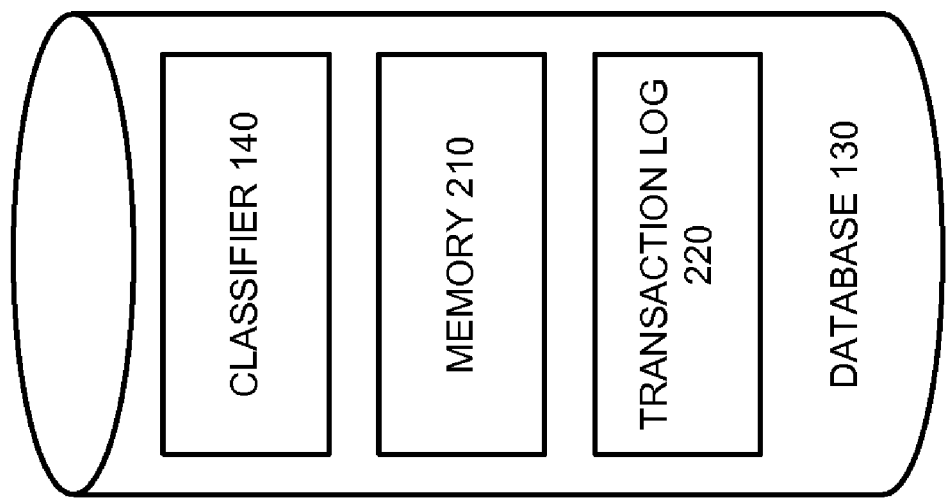
FIG. 2 illustrates a database in accordance with an embodiment of the present invention.

FIG. 2 illustrates a database 130 in accordance with an embodiment of the present invention. Database 130 includes classifier 140, memory 210, and transaction log 220.

Memory 210 can generally include any type of volatile memory that can store data and database operations. Note that this data may or may not be associated with the database operations.

Transaction log 220 can generally include any log that stores a history of database operations that database 130 has executed. In one embodiment of the present invention, non-volatile memory stores transaction log 220.

In one embodiment of the present invention, memory 210 stores transaction log 220 or a portion of transaction log 220.

Automatically Classifying Data in a Database

Figure 3:
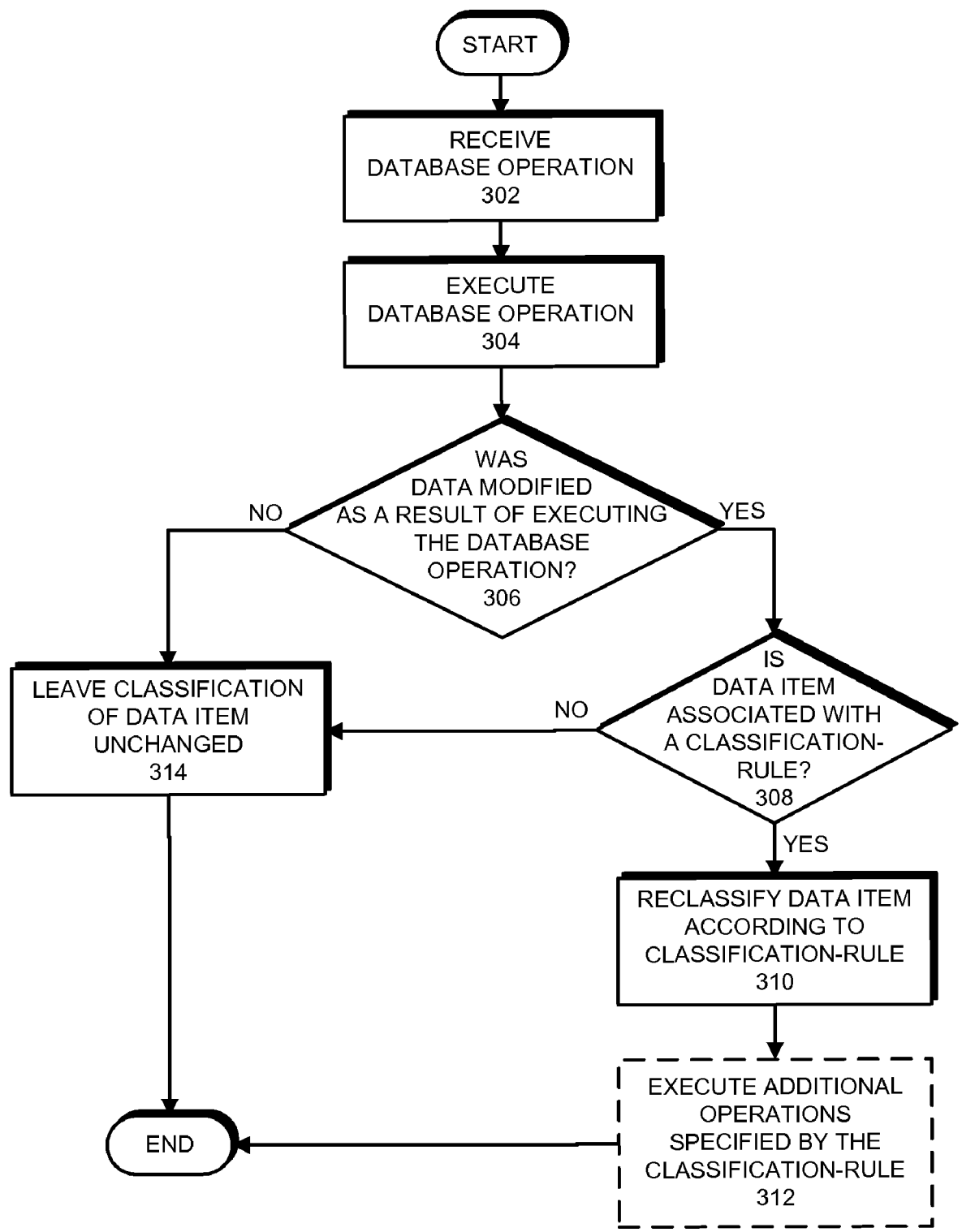
FIG. 3 presents a flowchart illustrating the process of automatically classifying data in a database in accordance with an embodiment of the present invention.

FIG. 3 presents a flowchart illustrating the process of automatically classifying data in a database 130 in accordance with an embodiment of the present invention. The process begins when database 130 receives a database operation from user 112 via client 110 (operation 302).

In one embodiment of the present invention, database 130 receives the database operation from an application or a server.

Database 130 then executes the database operation (operation 304). Next, classifier 140 determines if data was changed as a result of classifier 140 executing the database operation (operation 306). Note that classifier 140 automatically determines if any data was modified, i.e., without assistance from user 112, an application, a server, or any other external system. If data was modified, for each data item that was modified, classifier 140 automatically determines if the data item is associated with a classification-rule (operation 308).

In one embodiment of the present invention, classifier 140 determines for each data item if the data item is associated with a classification-rule. In this embodiment, classifier 140 identifies classification-rules for both modified and unmodified data items.

In one embodiment of the present invention, determining if the data item is associated with the classification-rule involves using a hash function to facilitate identifying the classification-rule associated with the data item. In this embodiment, classifier 140 generates a hash for the data item. Then, classifier 140 uses this hash to determine if a classification-rule exists which is associated with the data item.

In one embodiment of the present invention, determining if the data item is associated with the classification-rule involves classifier 140 performing a pattern recognition operation. In this embodiment, classifier 140 identifies a pattern associated with the modified data. Classifier 140 then determines if a classification-rule exists which is associated with the pattern. This pattern can be based on attributes or factors associated with the data item or the database operation. For example, these attributes and factors can include: how the data item was modified (i.e., created, deleted, amended, etc.); the format of the data item (e.g., numeric, alphanumeric, etc.); what additional data items were modified by the database operation; who issued the database operation; what data items were selected; etc.

In one embodiment of the present invention, determining if any of the data was modified as a result of executing the database operation can involve classifier 140 examining transaction log 220, or a portion of transaction log 220.

In one embodiment of the present invention, classifier 140 can examine transaction log 220 by examining memory 210.

If the data item is associated with a classification-rule, classifier 140 automatically reclassifies the data item according to the classification-rule (operation 310). Note that this may or may not change the classification of the data item. Classifier 140 then executes additional operations specified by the classification-rule (operation 312). Note that operation 312 is optional as is illustrated by the dashed lines surrounding operation 312.

In one embodiment of the present invention, the additional operations can involve: encrypting the data item; encrypting a row in the database associated with the data item; encrypting a column in the database associated with the data item; encrypting metadata in the database associated with the data item; decrypting the row in the database associated with the data item; decrypting the column in the database associated with the data item; decrypting the metadata in the database associated with the data item; sending an alert to a user who is associated with the classification-rule; rejecting the database operation; recording operations involving the data item in a log; modifying access control privileges associated with the data item; auditing the database; and any other operation that classifier 140 or database 130 can be configured to perform.

In one embodiment of the present invention, reclassifying the data item involves associating an initial classification with the data item. Note that this may occur when database 130 initially stores the data item.

In one embodiment of the present invention, the classification for a data item is associated with a privilege-level that user 112 requires to access the data item.

In one embodiment of the present invention, changing the classification of a data item may result in changing the classification of additional data items associated with the data item. For example, changing the classification of a field in a table may result in changing the classification of the entire table.

If data was not changed, or if a changed data item is not associated with a classification-rule, classifier 140 leaves the classification of the data item unchanged (operation 314).

In one embodiment of the present invention, after reclassifying the data item, classifier 140 can store the result of executing the database operation in database 130.

In one embodiment of the present invention, after reclassifying the data item, classifier 140 can present the result of executing the database operation to user 112.

In one embodiment of the present invention, as a result of reclassifying the data item, classifier 140 prevents user 112 from accessing the data or from completing the database operation.

In one embodiment of the present invention, classifier 140 can ensure that new data items comply with a set of rules by associating all data items with a specific classification-rule.

In one embodiment of the present invention, classifier 140 can ensure that new data items added to specific tables or data structures comply with a set of rules by associating all data items added to the specific tables or data structures with a specific classification-rule.

In one embodiment of the present invention, classifier 140 reclassifies data blocks. In this embodiment, classifier 140 reclassifies all data items within a data block, wherein the data block includes at least one data item that has been modified. Note that the size of the data block may be determined by: database 130, memory 210; classifier 140; or user 112.

In one embodiment of the present invention, the system reclassifies the data item if the data item satisfies an arbitrary rule. For example, the system may reclassify the data only if the data was modified outside of normal operating hours.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically classifying data in a database, the method comprising:

executing a received database operation;

determining, by a computer, that a data item in the database is modified as a result of executing the database operation;

determining, by the computer, that the data item is associated with a classification rule, which corresponds to a privilege level required for accessing the data item, reclassifying, by the computer, the data item according to the classification rule, and executing an additional operation specified by the classification rule, wherein the additional operation comprises modifying the privilege level.

2. The method of claim 1, wherein determining that the data item is modified as a result of executing the database operation involves examining a transaction log for the database.

3. The method of claim 1, wherein the classification for the data item is associated with a privilege level required to access the data item.

4. The method of claim 1, wherein determining that the data item is associated with the classification rule involves using a hash function to facilitate identifying the classification-rule associated with the data item.

5. The method of claim 1, wherein determining that the data item is associated with the classification rule involves matching the data item to a pattern which is associated with the classification-rule.

6. The method of claim 1, further comprising executing additional operations specified by the classification rule.

7. The method of claim 6, wherein the additional operations can involve one or more of the following operations:

encrypting the data item;

encrypting a row in the database associated with the data item;

encrypting a column in the database associated with the data item;

encrypting metadata in the database associated with the data item;

decrypting the row in the database associated with the data item;

decrypting the column in the database associated with the data item;

decrypting the metadata in the database associated with the data item;

sending an alert to a user who is associated with the classification-rule;

rejecting the database operation;
recording operations involving the data item in a log; and
auditing the database.

8. The method of claim 1, further comprising presenting the data item to a user after reclassifying the data item.

9. The method of claim 1, wherein determining that the data item is associated with the classification rule further involves determining if the data item satisfies an arbitrary rule.

10. A non-transitory computer-readable storage medium storing instructions that when executed by a computer cause the computer to perform a method for automatically classifying data in a database, the method comprising:
   executing a received database operation;
   determining, by a computer, that a data item in the database is modified as a result of executing the database operation;
   determining, by the computer, that the data item is associated with a classification rule, which corresponds to a privilege level required for accessing the data item,
   reclassifying, by the computer, the data item according to the classification rule, and
   executing an additional operation specified by the classification rule, wherein the additional operation comprises modifying the privilege level.

11. The non-transitory computer-readable storage medium of claim 10, wherein determining that the data item is modified as a result of executing the database operation involves examining a transaction log for the database.

12. The non-transitory computer-readable storage medium of claim 10, wherein the classification for the data item is associated with a privilege level required to access the data item.

13. The non-transitory computer-readable storage medium of claim 10, wherein determining that the data item is associated with the classification rule involves using a hash function to facilitate identifying the classification-rule associated with the data item.

14. The non-transitory computer-readable storage medium of claim 10, wherein determining that the data item is associated with the classification-rule involves matching the data item to a pattern which is associated with the classification rule.

15. The non-transitory computer-readable storage medium of claim 10, wherein the method further comprises executing additional operations specified by the classification rule.

16. The non-transitory computer-readable storage medium of claim 15, wherein the additional operations can involve one or more of the following operations:
   encrypting the data item;
   encrypting a row in the database associated with the data item;
   encrypting a column in the database associated with the data item;
   encrypting metadata in the database associated with the data item;
   decrypting the row in the database associated with the data item;
   decrypting the column in the database associated with the data item;
   decrypting the metadata in the database associated with the data item;
   sending an alert to a user who is associated with the classification-rule;
   rejecting the database operation;
   recording operations involving the data item in a log; and
   auditing the database.

17. The non-transitory computer-readable storage medium of claim 10, wherein the method further comprises presenting the data item to a user after reclassifying the data item.

18. The non-transitory computer-readable storage medium of claim 10, wherein determining that the data item is associated with the classification rule further involves determining if the data item satisfies an arbitrary rule.

19. An apparatus that automatically classifies data in a database, comprising:
   an execution mechanism configured to execute a received database operation;
   a determination mechanism configured to automatically determine that a data item in the database is modified as a result of executing the database operation;
   wherein the determination mechanism is further configured to automatically determine that the data item is associated with a classification rule, which corresponds to a privilege level required for accessing the data item;
   a reclassification mechanism configured to reclassify the data item according to the classification rule; and
   a execution mechanism configured to execute an additional operation specified by the classification rule, wherein the additional operation comprises modifying the privilege level.

20. The apparatus of claim 19, wherein the determination mechanism is configured to examine a transaction log for the database.

21. The apparatus of claim 19, wherein a classification for the data item is associated with a privilege level required to access the data item.

22. The apparatus of claim 19, wherein the determination mechanism is configured to use a hash function to facilitate identifying the classification rule associated with the data item.

23. The apparatus of claim 19, wherein the determination mechanism is configured to match the data item to a pattern which is associated with the classification rule.

24. The apparatus of claim 19, wherein the execution mechanism is configured to execute additional operations specified by the classification rule.

25. The apparatus of claim 24, wherein the additional operations can involve one or more of the following operations:
   encrypting the data item;
   encrypting a row in the database associated with the data item;
   encrypting a column in the database associated with the data item;
   encrypting metadata in the database associated with the data item;
   decrypting the row in the database associated with the data item;
   decrypting the column in the database associated with the data item;
   decrypting the metadata in the database associated with the data item;
   sending an alert to a user who is associated with the classification-rule;
   rejecting the database operation;
   recording operations involving the data item in a log; and
   auditing the database.

* * * * *